United States Patent
Bjerkemo (10) Patent No.: US 9,341,141 B2
(45) Date of Patent: May 17, 2016

(54) VARIABLE JET ENGINE OUTLET WITH A MAINLY CIRCLE SECTOR-FORMED CROSS SECTION

(75) Inventor: Jakob Bjerkemo, Linkoeping (SE)

(73) Assignee: SAAB AB, Linkoeping (SE)

( * ) Notice: Subject to any disclaimer, the term of this patent is extended or adjusted under 35 U.S.C. 154(b) by 353 days.

(21) Appl. No.: 14/123,379

(22) PCT Filed: Jun. 17, 2011

(86) PCT No.: PCT/SE2011/050780
§ 371 (c)(1),
(2), (4) Date: Dec. 10, 2013

(87) PCT Pub. No.: WO2012/173546
PCT Pub. Date: Dec. 20, 2012

(65) Prior Publication Data
US 2014/0103141 A1    Apr. 17, 2014

(51) Int. Cl.
*F02K 1/12* (2006.01)
*F02K 1/80* (2006.01)
*F02K 1/82* (2006.01)
*F02K 1/78* (2006.01)

(52) U.S. Cl.
CPC ............... *F02K 1/123* (2013.01); *F02K 1/1215* (2013.01); *F02K 1/1238* (2013.01); *F02K 1/78* (2013.01); *F02K 1/80* (2013.01); *F02K 1/82* (2013.01); *F02K 1/822* (2013.01); *Y02T 50/671* (2013.01); *Y02T 50/675* (2013.01)

(58) Field of Classification Search
CPC ............. F02K 1/002; F02K 1/04; F02K 1/08; F02K 1/085; F02K 1/10; F02K 1/09; F02K 1/1253; F02K 1/12; F02K 1/123; F02K 1/1215; F02K 1/44; F02K 1/40; F02K 1/42; F02K 1/52; F02K 1/78; F02K 1/80; F02K 1/82
See application file for complete search history.

(56) References Cited

U.S. PATENT DOCUMENTS

| | | | |
|---|---|---|---|
| 3,024,599 A * | 3/1962 | Keen | F02K 1/06 239/265.37 |
| 3,352,514 A | 11/1967 | Maguire | |
| 3,442,471 A | 5/1969 | Fischer et al. | |

(Continued)

FOREIGN PATENT DOCUMENTS

| | | |
|---|---|---|
| EP | 1640590 A2 | 3/2006 |
| GB | 2428414 A | 1/2007 |

OTHER PUBLICATIONS

European Patent Office, Extended European Search Report for Application No. 11867787.1, Jan. 29, 2015, 5 pages, Germany.

(Continued)

*Primary Examiner* — Andrew Nguyen
(74) *Attorney, Agent, or Firm* — Alston & Bird LLP (57) ABSTRACT

The present invention relates to a low signature jet engine outlet comprising movable border segments forming at least one circular arc and being movable radially for controlling the form and area of the outlet, at least one stationary border element for defining the form and area of the outlet, and movable coupling means for connecting the at least one circular arc to the at least one stationary border element. The coupling means are movable along a connection part of the at least one stationary border element, and the connection part of the at least one stationary border element is substantially flat and extending in a substantially radial direction of the at least one circular arc.

11 Claims, 14 Drawing Sheets

(56) References Cited

U.S. PATENT DOCUMENTS

| | | | |
|---|---|---|---|
| 3,687,399 A | 8/1972 | Tumavicus | |
| 3,837,579 A | 9/1974 | Camboulives et al. | |
| 4,577,814 A | 3/1986 | Bayle Laboure et al. | |
| 4,753,392 A | 6/1988 | Thayer et al. | |
| 5,372,006 A * | 12/1994 | Lair | F02K 1/06 239/265.19 |
| 6,164,563 A | 12/2000 | Bouiller et al. | |
| 7,096,662 B2 | 8/2006 | Wehner | |
| 2012/0104747 A1 * | 5/2012 | Ruberte Sanchez | B64C 15/02 285/299 |

OTHER PUBLICATIONS

International Searching Authority, International Search Report and Written Opinion for International Application No. PCT/SE2011/050780, mailed Feb. 17, 2012, 9 pages, Swedish Patent and Registration Office, Sweden.

* cited by examiner

Fig 1

"Prior art"

VARIABLE JET ENGINE OUTLET WITH A MAINLY CIRCLE SECTOR-FORMED CROSS SECTION

CROSS REFERENCE TO RELATED APPLICATIONS

This application is a national stage application, filed under 35 U.S.C. §371, of International Application No. PCT/SE2011/050780, filed Jun. 17, 2011, the contents of which are hereby incorporated by reference in its entirety.

BACKGROUND

1. Related Field

The present invention relates to a low signature jet propulsion motor outlet.

2. Description of Related Art

Stealth technology is a sub-discipline of military tactics, which aims at designing e.g. aircrafts, ships and missiles which are difficult to detect with e.g. radar, infrared or sonar. This can be done by developing a particular shape for the surfaces that tends to reduce detection, by redirecting electromagnetic waves from radars. Another way is to cover the construction with a radar absorbent material that reduces or blocks radar signals. Shields that hide a heat source can be effective against infrared detectors.

When designing an aeroplane with a low signature the jet motor outlet causes problems. Motor outlets that are designed to have a low signature normally have a constant cross section area, i.e. the size of the outlet cannot be changed. This makes it very difficult to adapt them to velocities above the speed of sound or to use an after-burner. Some outlets have a rectangular cross section, which leads to a heavy and expensive construction that is not optimal in a stealth perspective.

Conventional aeroplanes normally use an outlet with a circular cross section since they have high performance and a low weight. However, from a signature point of view, a circular cross section is ineffective, since the curved outer surfaces give reflexes within wide angles. One solution to combining a low signature with a circular outlet is to hide the outlet with e.g. stabilizers or tail booms on both sides of the outlet. GB 2428414 A shows an aircraft which engines are mounted forward of the trailing edge of a wing and between two vertical stabilizers. The benefit with this location is to reduce ground detectable acoustic signatures and infra red signatures. The construction suffers from the drawback of aerodynamic problems like e.g. large surfaces and a large cross section area in the rear parts of the aeroplane and a squeezed flow.

The form and size of a circular motor outlet can be adjusted to different flight situations by providing controllable border surface elements at the periphery of the outlet. Those border surface elements can be hinged in the fixed channel of the motor outlet and be controlled by e.g. hydraulic means. A problem that arises with these variable circular outlets is the leakage of noise and heat from the edges and from the gap between the border surface elements.

BRIEF SUMMARY

It shall be noted that through this application "front" parts of the outlet refers to the parts that are located upstream from an engine point of view and the "rear" parts are located downstream.

The present invention tries to overcome the above mentioned weaknesses of the known technology.

The object of the invention is to create a jet engine motor outlet with a low signature. Another object with the present invention is to create a jet engine motor outlet which has a low weight. Still a further object of the present invention is to create a jet engine motor outlet with good propulsion and aerodynamic characteristics.

The solution has been to design a jet engine motor outlet according to the characterizing parts of claim 1. The invention defines a jet engine outlet comprising:
- movable border segments forming at least one substantially circular arc and being movable radially for controlling the form and area of the outlet,
- at least one stationary border element for defining the form and area of the outlet, and
- movable coupling means for connecting the at least one circular arc to the at least one stationary border element, wherein the coupling means are movable along a connection part of the at least one stationary border element, and the connection part of the at least one stationary border element is substantially flat and extending in a substantially radial direction of the at least one circular arc.

The present invention further defines the movable border segments and the movable coupling means being hingedly connected to a fixed part of the outlet channel. It also provides pressure inducing means acting in the main direction of the outlet and affecting the movable border segments and the movable coupling means by means of a linkage system.

This invention has the effect that the technology used for varying the area of circular outlets can be applied to outlets with other forms having a lower signature than a circular outlet. This means that the outlet is light, it is difficult to detect, it can be directed and still has acceptable propulsion and aerodynamic characteristics.

The present invention further defines that the movable coupling means comprise an upper part that is positioned on one side of the stationary border element, a lower part that is positioned on the other side of the stationary border element, and a connection element for connecting the upper part with the lower part. The connection element is moved in a guide channel in the stationary border element. The upper part of the movable coupling means is formed as an oblong segment that is bent approximately 90° in a lengthwise direction.

The advantages of the movable coupling means being bent and being movable in a guide channel is that the coupling means seal to the stationary border element so that no leaks of engine gases occur. The pressure acting on the movable border segments and the movable coupling means in the radial direction of the circular arcs is handled by the pressure inducing means and the linkage system, whereas the pressure from the engine gases acting on the movable coupling means in the direction towards the stationary border element is handled by the resistance of the stationary border element.

According to one embodiment of the invention the movable border segments form a semicircle. This has an advantage that the outlet can be integrated into the construction lines of the aircraft. By letting the stationary border element protrude behind the circular arc and by providing stabilizers, which can be substantially vertical, or inward or outward leaning, on both sides of the outlet, the outlet can be shielded both from below and from the sides.

According to another embodiment of the invention the movable border segments form two circular arcs, which arcs are located symmetrically on the same vertical axis, one above the other, and with the concave sides of the arcs directed towards each other. This has the advantage that the outlet can be shielded from the sides by e.g. two tail booms, integrated with the outlet, one tail boom on each side.

BRIEF DESCRIPTION OF THE FIGURES

Further advantages and features of the invention can be can be derived from the following detailed description of exemplary embodiments of the invention, with reference to the drawings.

DETAILED DESCRIPTION OF VARIOUS EMBODIMENTS

Figure 1:
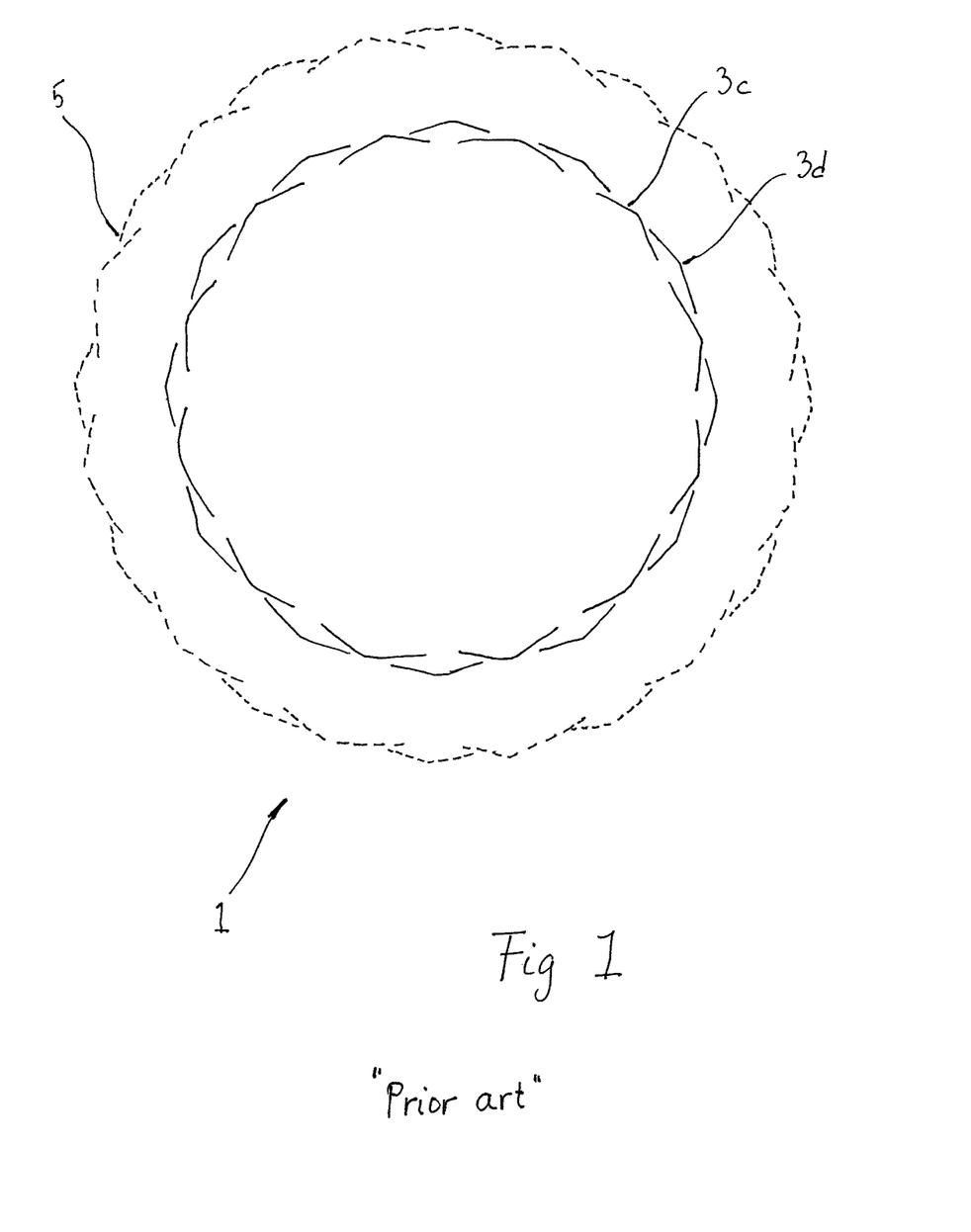
FIG. 1 is a schematic cross section rear view of a circular jet engine outlet according to the state of the art.

With reference to FIG. 1, a circular jet engine outlet 1 according to the state of the art is generally depicted. FIG. 1 shows a schematically cross section image of a circular outlet seen from a point behind the outlet. The outlet is constructed by two layers of overlapping, slightly bent movable border segments 3c, 3d.

The outlet area can be varied by moving the border segments 3c, 3d in and out along the radius. An enlarged state of the outlet 5 is shown in dashed lines in FIG. 1. The front edge of the border segments are hinged on the fixed part 13 of the outlet and the rear ends of the border segments can be moved by e.g. hydraulic means. This cannot be seen in FIG. 1.

The two layer overlapping structure of the border segments 3c, 3d generates a variable but tight construction. Since the underlying segments 3c are pressed outwards towards the overlying segments 3d by the pressure from the gases, the underlying segments 3c automatically seal towards the overlying segments 3d so it is not necessary to control them, although it is possible. The overlying segments 3d, however, must be steered inwards, towards the underlying segments 3c, and outwards. It is also possible to use a one layer overlapping structure where one end of each segment overlaps the next segment. Some outlets are further provided with outer segments 11 which surround and protect the outlet, but they are not shown in FIG. 1.

Figure 2:
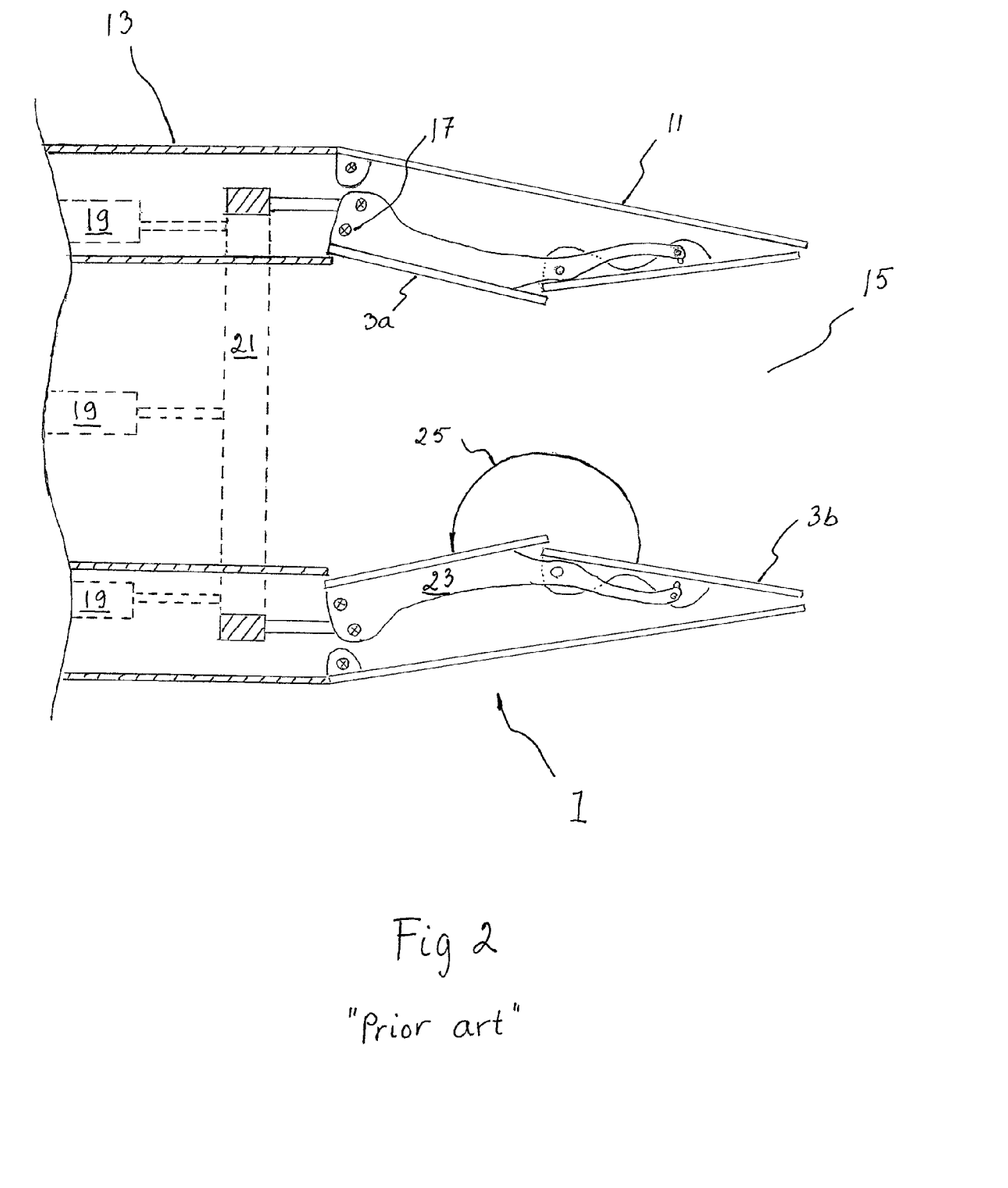
FIG. 2 is a schematic cross section side view of a convergent-divergent circular motor outlet according to the state of the art.

FIG. 2 shows a schematic side view cross section of a convergent-divergent circular motor outlet 1 according to the state of the art. Hot air flow from the left fixed part 13 of the outlet and continues through the convergent-divergent outlet to the opening 15 on the right side in the figure. The outlet has inner movable divergent border segments 3b, inner movable convergent border segments 3a and outer segments 11. The inner movable convergent border segments 3a are hinged at 17 to the fixed part 13 and can be turned to widen or narrowing the passage. This is performed by pressure inducing means 19, like e.g. hydraulic, electric or pneumatic means acting on a ring formed structure 21, which in turn affects a linkage system 23 that turns all the inner movable convergent border segments 3a. The ring formed structure 21 makes it possible to reduce the number of pressure inducing means 19, to only a few. Evidently, it is possible to have one pressure inducing means 19 for every border segment 3, but then it is difficult to regulate the pressure evenly and the system will be more complicated. The inner movable divergent border segments 3b are linked to the inner movable convergent border segments 3a and mainly follow them with approximately the same angle 25. The outer segments 11 can be fixed or movable and are not discussed here.

Figures 3A, 3B:
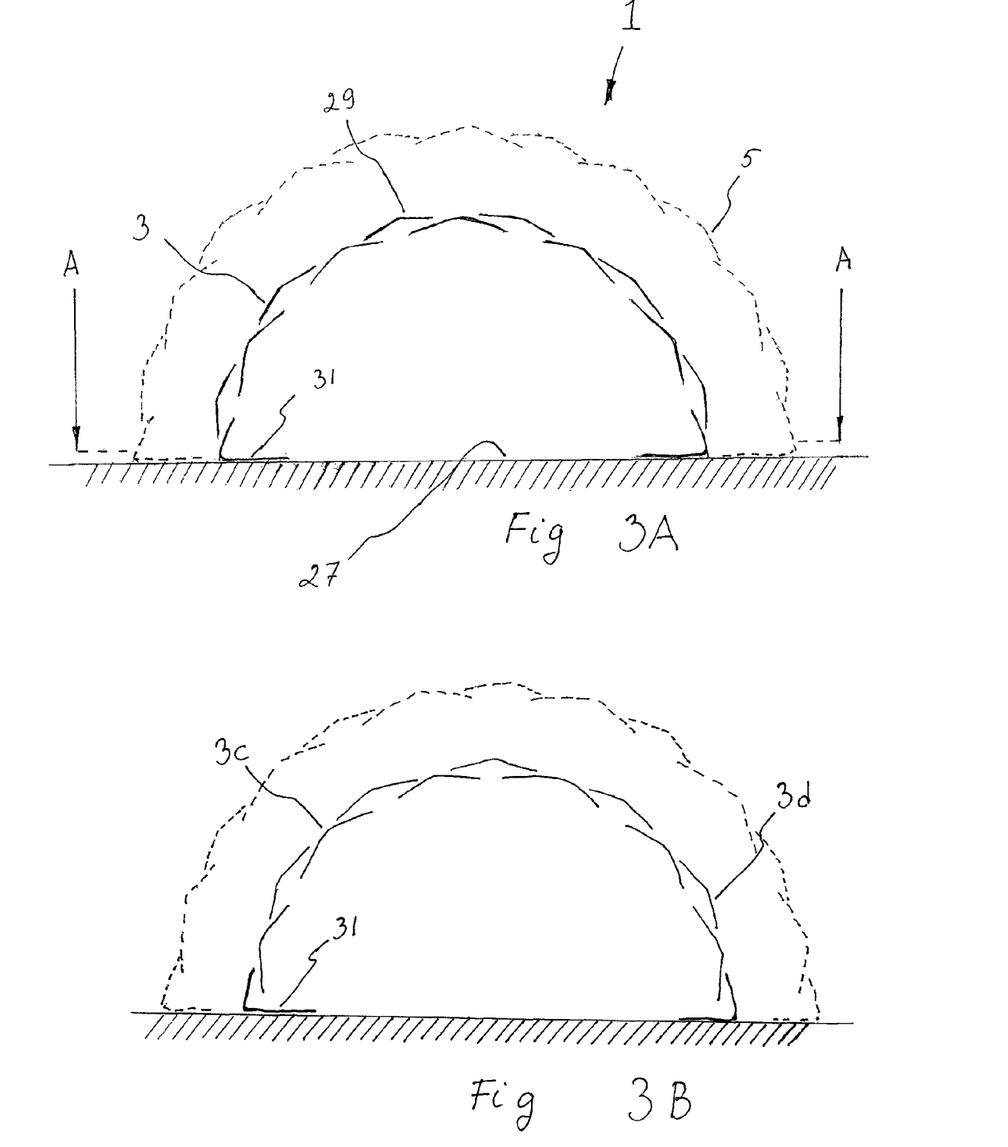
FIG. 3A is a schematic cross section rear view of a jet motor outlet with a variable area according to one embodiment of the invention.
FIG. 3B is a schematic cross section rear view of a jet motor outlet with a variable area according to one embodiment of the invention.
Figure 3C:
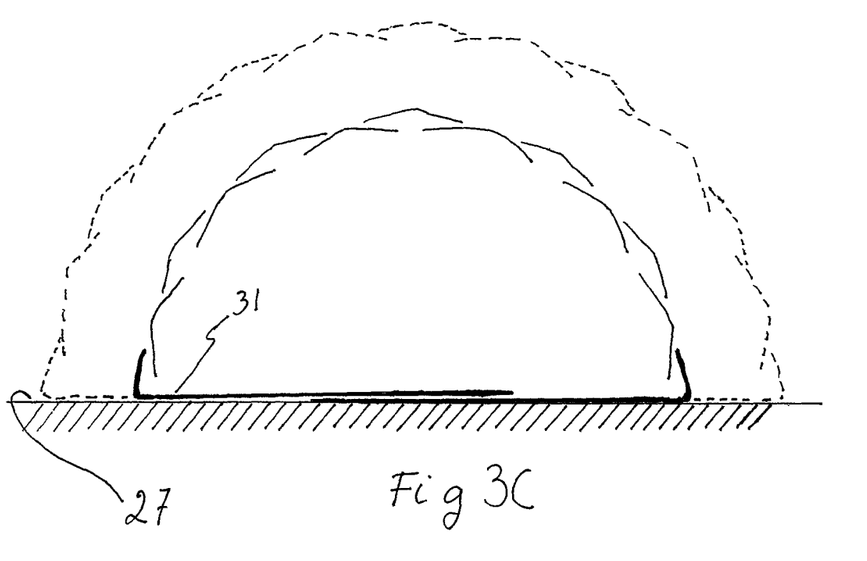
FIG. 3C is a schematic cross section rear view of a jet motor outlet with a variable area according to one embodiment of the invention.

One embodiment of the new invention is drawn in FIGS. 3A, 3B and 3C. These figures shows a jet motor outlet 1 with a variable area that principally works in the same manner as the circular motor outlet of the state of the art as drawn in FIGS. 1 and 2. The difference is that one half of the outlet is replaced by a stationary border element 27 which gives the outlet a cross section profile in the form of a semicircle with an upper substantially semicircular arc 29 and a substantially flat bottom. The stationary border element 27 can be a separate element or it can be integrated into the aircraft fuselage. The figures shows the outlet in a retracted state 1 and an enlarged state 5.

The outlet is provided with movable coupling means 31 located adjacent the stationary border element 27. The coupling means connect the movable border segments 3 with the stationary border element 27. They comprise a first flat part that can glide along the stationary border element 27 and a second part that fits to the movable border segments 3. The two parts are bent approximately 90° in regard to each other, so that they fit tightly to both the stationary border element 27 and the adjacent movable border segments 3.

In most of the figures in this application the movable coupling means 31 are overlapped by an overlying movable border segment 3d. It is to be understood that, instead, the movable coupling means 31 can overlap an underlying movable border segment 3c. See FIG. 3B.

In FIG. 3C, the movable coupling means 31 are extended and overlap each other.

This semicircular outlet can easily be integrated into the contour of the aircraft while still being light and having good propulsion and flight characteristics. It is also easy to direct the outlet to obtain thrust vectoring.

Figure 4:
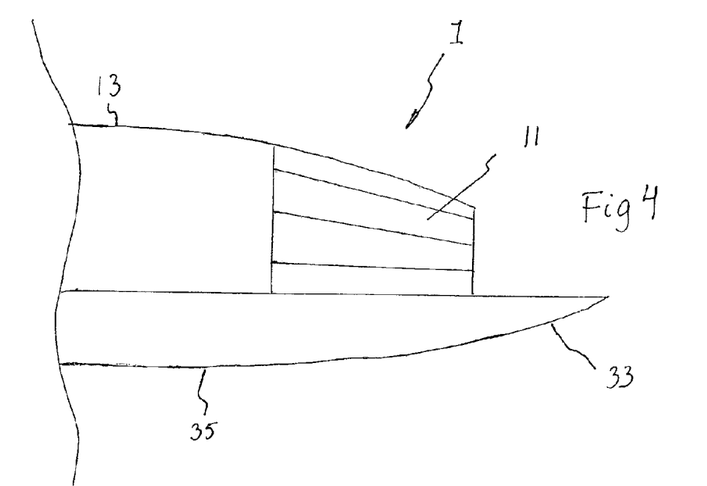
FIG. 4 is a side view of the outlet according to one embodiment of the invention.

FIG. 4 shows a side view of the outlet 1. From the figure it can be seen that the outlet is provided on a protruding shelf 33 on the frame 35. This shelf 33 protects the outlet from detection from the ground.

Figure 5:
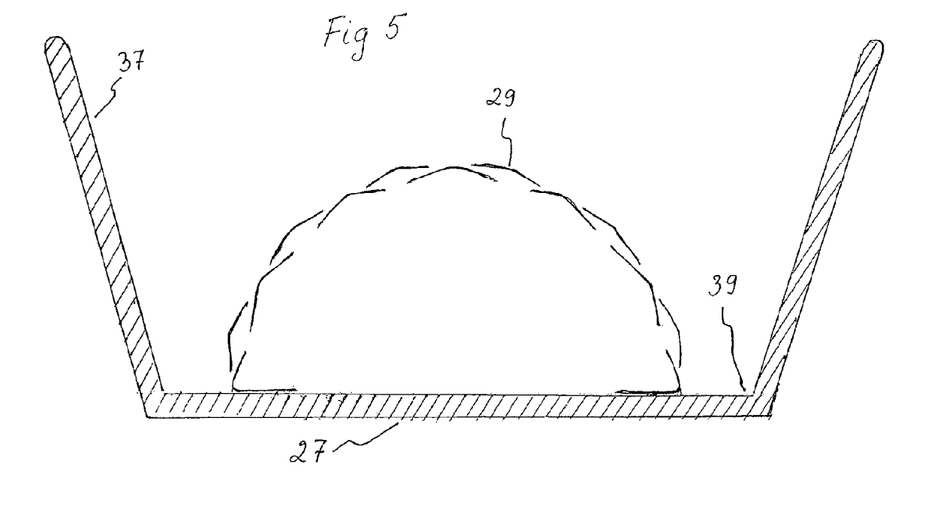
FIG. 5 is a schematic cross section rear view of a jet motor outlet according to the invention provided with shielding stabilizers.

The outlet can also be sheltered from the sides by providing stabilizers 37 on both sides of the outlet 1. Such stabilizers are shown in FIG. 5 and are already known in the art. The stabilizers can be substantially vertical, or outward or inward leaning. When stabilizers and a horizontal surface between them are used together to shield a circular outlet, the outlet will be placed over the horizontal surface and the air will be squeezed between the horizontal surface and the lower part of the outlet unless the distance between the outlet and the horizontal surface is large, which is hard to achieve on a fighter aircraft. With a semicircular outlet, the air passing in the corners 39 has more open space, resulting in less turbulence and better flight characteristics.

Figure 6:
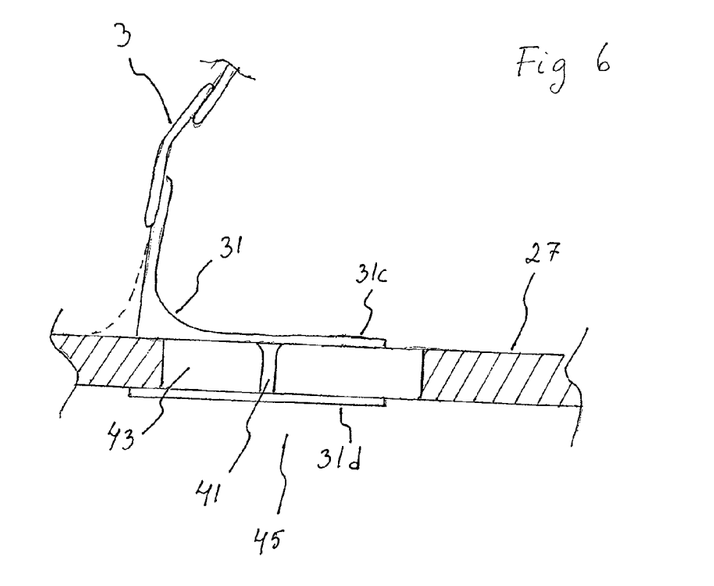
FIG. 6 is a detailed view of the movable coupling means.

One construction example of the movable coupling means 31 is shown in FIG. 6. It is important that the movable coupling means 31 seal against the stationary border element 27 so that no pressure or heat leaks appear. The movable coupling means 31 comprises a bent upper part 31c being located on the upper side of the stationary border element 27 and a lower part 31d, which is positioned on underside of the stationary border element 27. The upper and lower parts of the movable coupling means 31c, 31d are connected by a connection element 41 which is movable in a guide channel 43 in the stationary border element 27.

The parts of the stationary border element 27, which are connected to the movable coupling means 31 is hereafter referred to as the connection parts 45. If these connection parts 45 are substantially flat and directed substantially radially, towards the midpoint of the semicircle, a half of the ring formed structure 21 and the pressure inducing means 19, described together with FIG. 2, can be used also for controlling the movable coupling means 31 and the movable border segments 3 of a semicircular outlet.

The pressure inside the channel is directed normally to the border surfaces. Consequently the pressure on the movable border segments 3 and the parts of the movable coupling means 31 adjacent the movable border segments 3 is directed radially outwards and this pressure is resisted by the linkage system 23 and the pressure inducing means 19. The pressure on the stationary border element 27 and the parts of the movable coupling means 31 which is in contact with the stationary border element 27 is resisted by the strength of the stationary border element 27. This construction has the benefit that the movable coupling means 31 always seal towards the stationary border element 27, which reduces the risk of leaks or hot gases.

The outer side of the movable coupling means 31 can be curved (dashed lines) in order to further minimize the outlet signature and improve the aerodynamics. The strength of the movable coupling means (31) will also increase, which is advantageous since the pressure on the movable coupling means 31 is high and acts in many directions.

If the movable coupling means 31 are extended and overlapping, as in FIG. 3C, it is possible to let the movable coupling means 31 rest upon the stationary border element 27. The inner pressure from the gases presses the movable coupling means 31 outwards toward the stationary border element 27 and seals the seam between the movable coupling means 31. This makes the lower part 31d and the connection element 41 superfluous.

Figure 7:
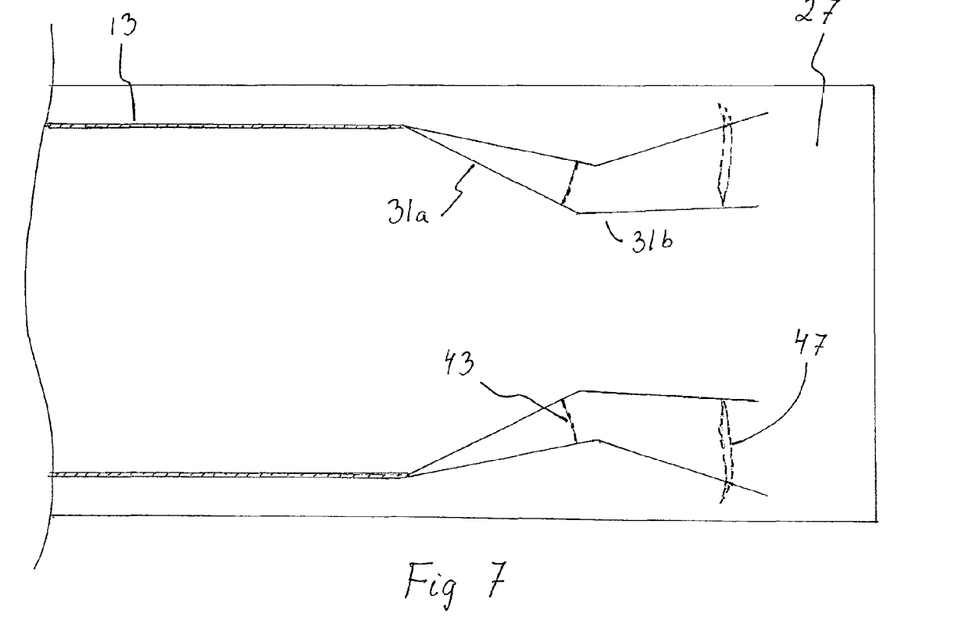
FIG. 7 is a cross section view of a semicircular outlet, seen from above, according to the cut A-A seen in FIG. 3.

FIG. 7 shows schematically a cross section of the movable coupling means 31 of a convergent-divergent semicircular outlet and the guide channels 43 seen from the cut (A-A) in FIG. 3. The figure shows the stationary border element 27, the fixed part of the outlet 13, and the movable convergent and divergent coupling means 31a, 31b in a retracted and a widened state. The dashed lines show how a point on the movable convergent and divergent coupling means 31a, 31b moves. As the movable convergent coupling means 31a are hinged, a point at the edge will move in a circular arc. Hence, the connection element 41 of the movable coupling means 31a can glide in a narrow glide channel 43 in the stationary border element 27. The divergent coupling means 31b are linked to the convergent coupling means 31a. Therefore a point at the divergent coupling means 31b will move over an area 47, so the glide channel for the divergent coupling means 31b must be wider.

Figure 8:
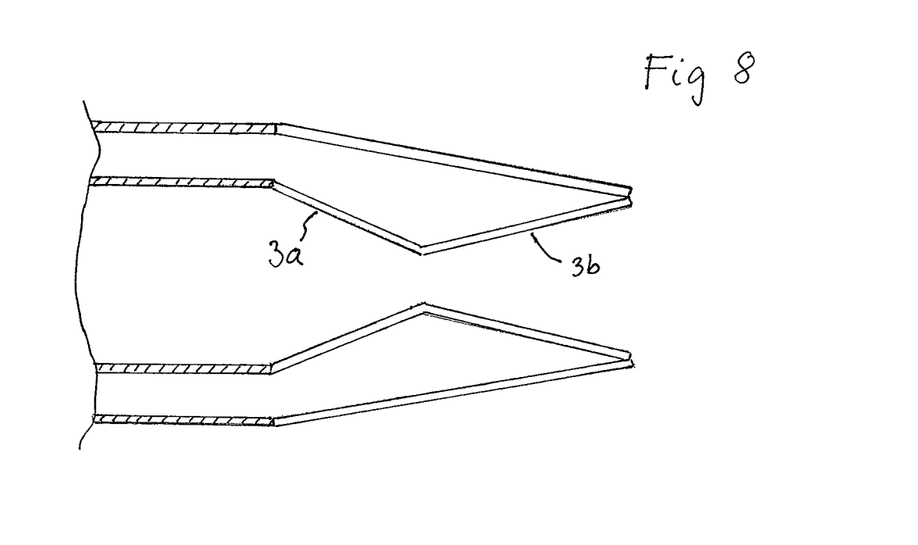
FIG. 8 is a schematic side view of a cross section of a circular convergent-divergent outlet of the state in the art.

FIG. 8 displays schematically a cross section of a circular convergent-divergent outlet of the state in the art. A similar outlet is shown in FIG. 2. This type of outlet can be used on aircrafts flying above the speed of sound. The striped parts in the figure show the fixed channel and the unfilled parts show the movable border segments 3a, 3b.

Figure 9:
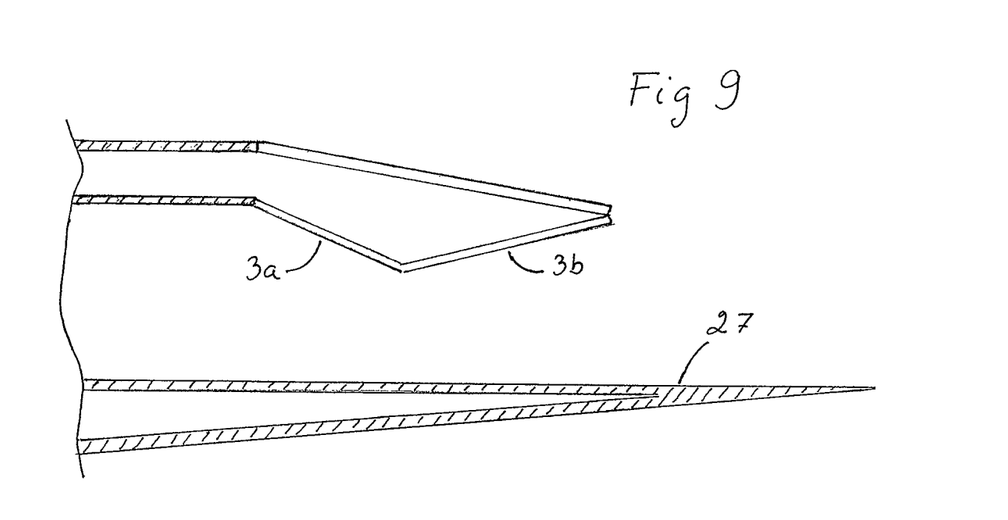
FIG. 9 is a schematic side view of a cross section of a circular convergent-divergent outlet according to the invention.

FIG. 9 displays a cross section of a variable convergent-divergent outlet according to the invention with the movable border segments 3a, 3b forming the upper semicircular border of the outlet and the stationary border element 27 protruding behind the outlet and shielding the semicircular arc.

Figure 10:
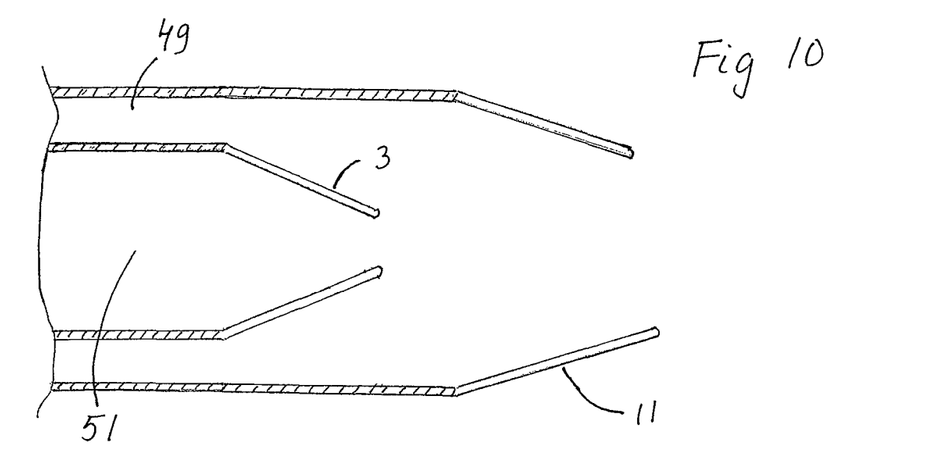
FIG. 10 is a schematic side view of a cross section of a variable ejector outlet according to the state in the art.

FIG. 10 presents a cross section of an ejector outlet with a variable circular outlet which can be used on aircrafts flying above the speed of sound. In this kind of outlets a secondary air stream 49 passes between the inner 3 and the outer segments 11 and the secondary air stream 49 affects the primary air stream 51 in a way similar to a divergent surface.

Figure 11:
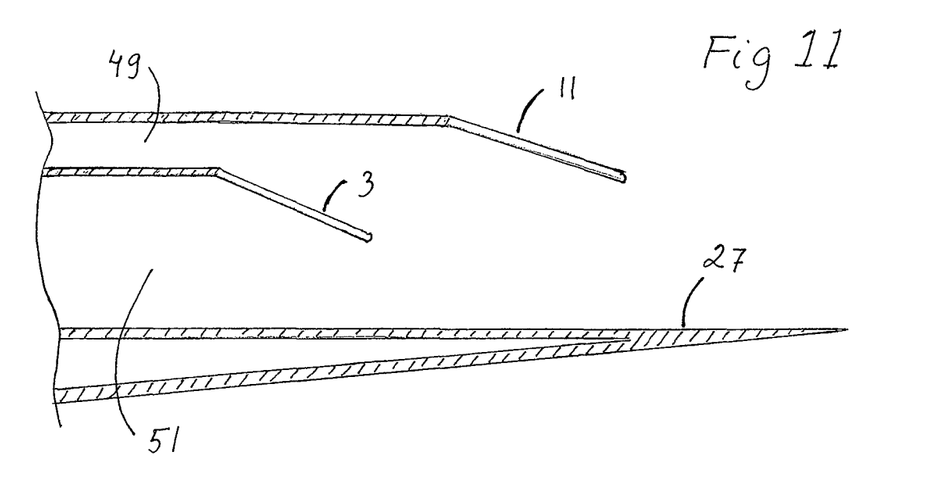
FIG. 11 is a schematic side view of a cross section of a variable ejector outlet according to the invention.

FIG. 11 shows that the invention can be applied to other outlets than a convergent-divergent outlet. FIG. 11 displays a cross section of a variable ejector outlet according to the invention with the movable border segments 3 forming the upper border of the outlet and the stationary border element 27 protruding behind the outlet and shielding the semicircular arc.

Figure 12:
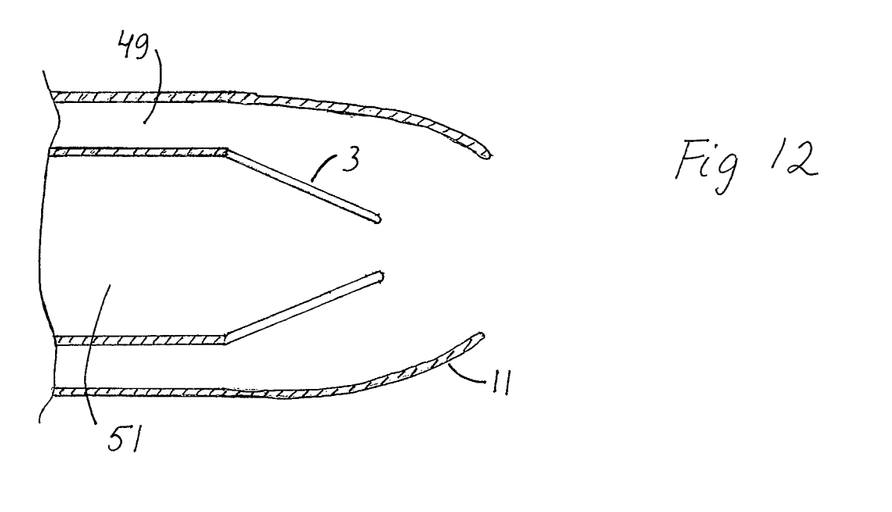
FIG. 12 is a schematic side view of a cross section of a fixed ejector outlet according to the state in the art.
Figure 13:
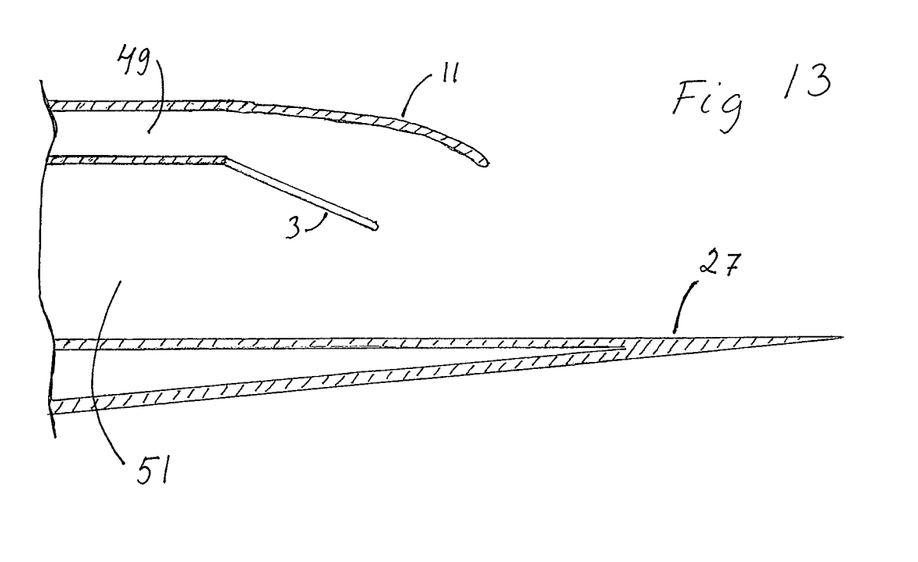
FIG. 13 is a schematic side view of a cross section of a fixed ejector outlet according to the invention.

FIGS. 12 and 13 show a cross section of an ejector with a fixed outlet. In FIG. 12 the outlet is circular and in FIG. 13 the outlet is semicircular according to the invention.

Figure 14:
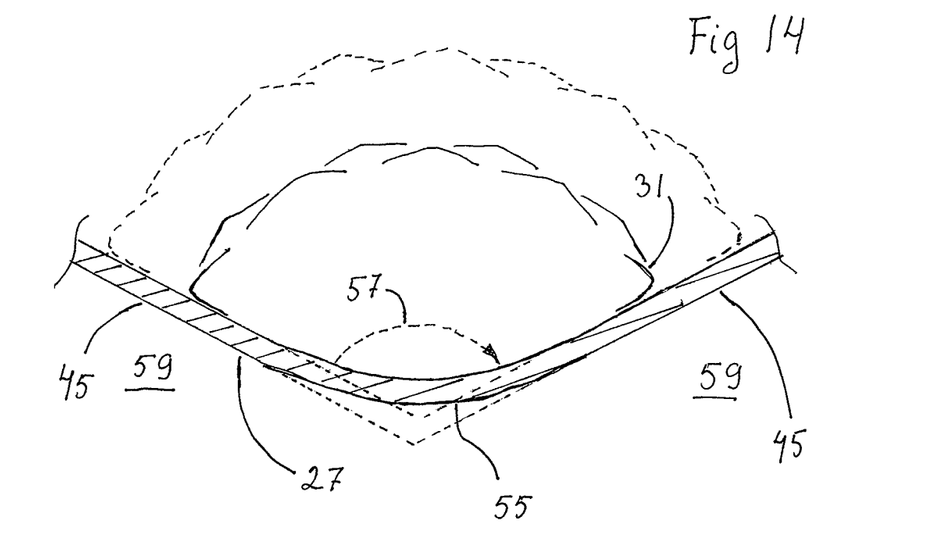
FIG. 14 is a schematic rear view of a jet motor outlet according to one embodiment of the invention.

In another embodiment the cross section of the outlet has approximately the form of a circular segment 53, which is depicted in FIG. 14. As can be seen in the figure, the stationary border element 27 is constituted by two substantially flat connection parts 45 with a curved surface 55 between them. It is important that the connection parts 45 are flat and directed substantially radially, related to the circular segment, if the ring formed structure 21 and pressure inducing means 19 described earlier in the application is to be used. It should be realized from the figure that the movable coupling means 31 can slide on the stationary border element 27 in a guide channel 43 in the same manner as in a semicircular outlet.

The curved surface 55 has no restrictions and can principally have any form. The curved surface 55 shown in FIG. 14 can e.g. be formed as straight extensions of the flat connection parts 45, which would result in a cross section in the form of a circle section (dashed lines). The angle 57 of the circular segment in the figure is about 135°. The angle of the segment is, however, not limited to 135° but could principally have any angle between 0° and 360°.

This embodiment has the advantage that the outlet can be partly integrated in the structure of e.g. two tail booms 59 located under each side of the outlet. This is another way to hide the outlet from the sides and make it difficult to detect the aircraft while still having good flight properties and a low weight.

In the further embodiments the outlet is supposed to be integrated in the structure of e.g. two tail booms 59, which restricts the size and form of the outlet. These embodiments are presented in FIGS. 15-18. In these figures the cross section is built of two circle segments 53 pointing at each other, connected in some way. The two stationary border elements 27 comprise flat connection parts 45 in the areas which come in contact with the movable coupling means 31. This has the benefit that the movable coupling means 31 and the movable border segments 3 can be steered by two arcs of the ring formed structure 21 and the pressure inducing means 19 described earlier (not shown in FIG. 15). The stationary border elements 27 can be separate elements or they can be integrated into the aircraft fuselage.

Figure 15:
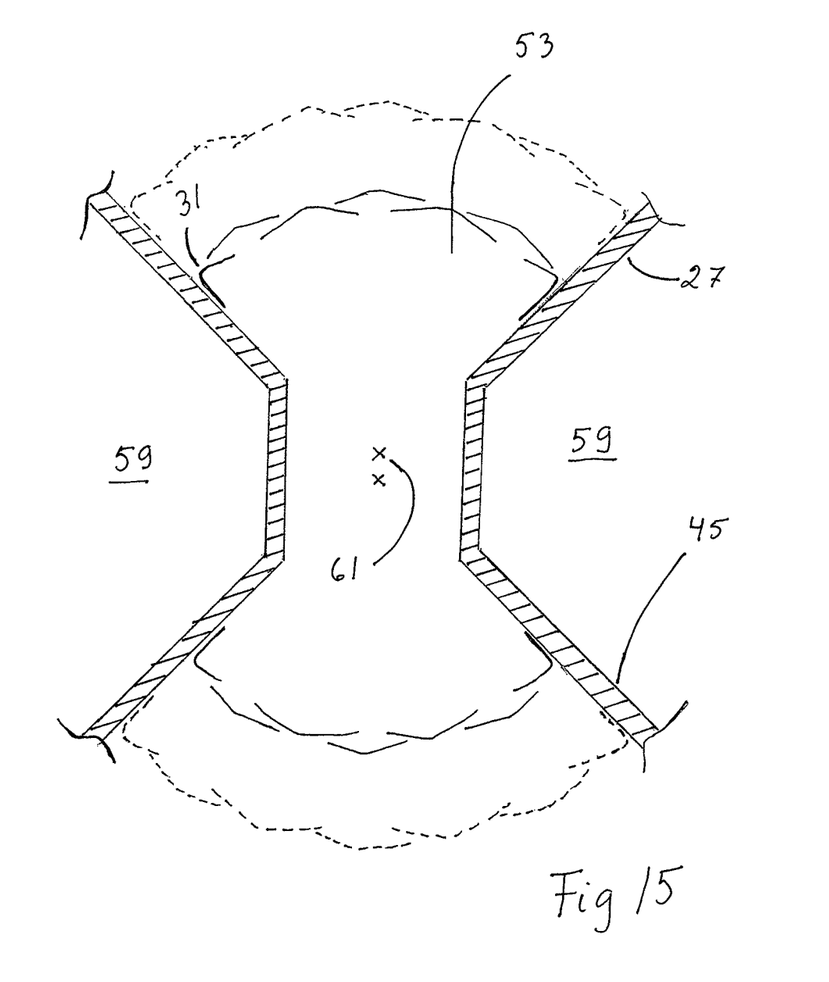
FIG. 15 is a schematic rear view of a jet motor outlet according to one embodiment of the invention.
Figure 16:
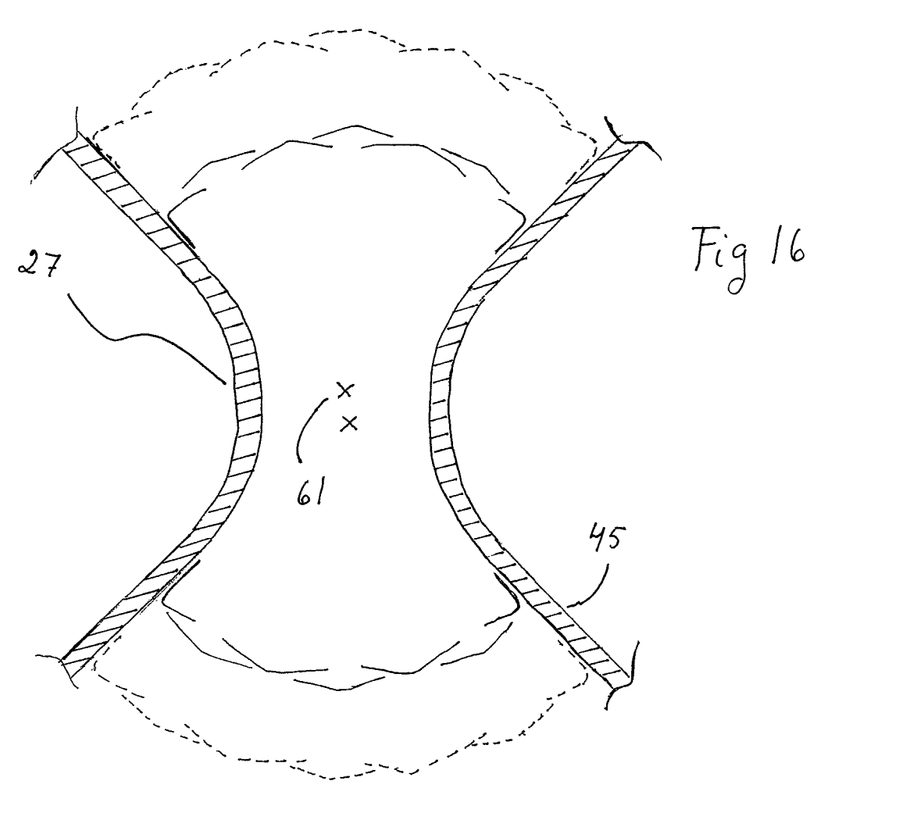
FIG. 16 is a schematic rear view of a jet motor outlet according to one embodiment of the invention.

The principle of the movable coupling means 31 gliding in guide channels in the stationary border elements 27 can be applied to these embodiments. The form of the parts of the stationary border elements 27 that do not belong to the connection parts 45 are not limited by the invention. They can e.g. be straight as seen in FIG. 15 or curved as in FIG. 16.

Figure 17:
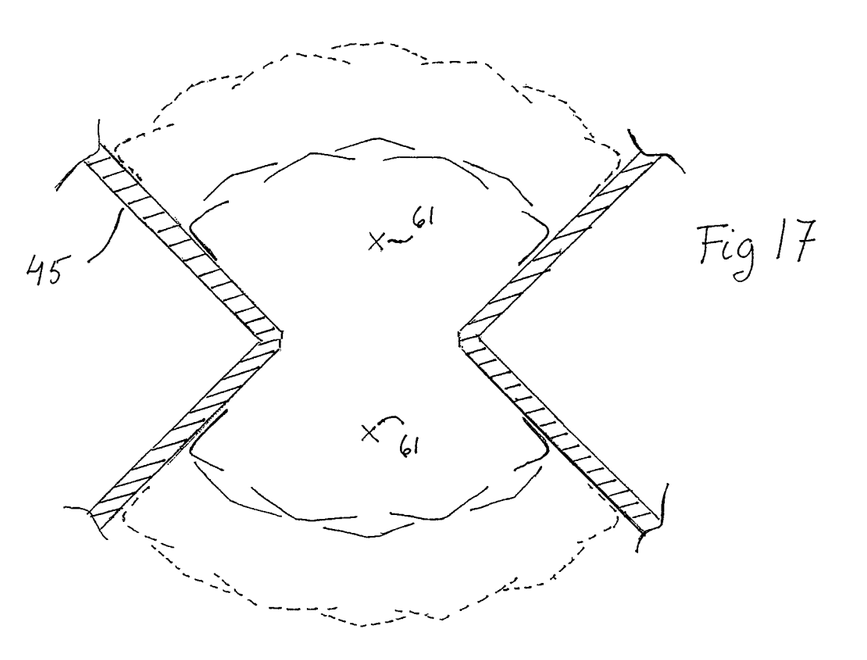
FIG. 17 is a schematic rear view of a jet motor outlet according to one embodiment of the invention.

The crosses show the circular midpoint 61 of the two segments. In FIG. 17 the two segments overlap. Still though, the connection parts 45 are substantially flat and directed substantially radially related to the adjacent circular segment.

Figure 18:
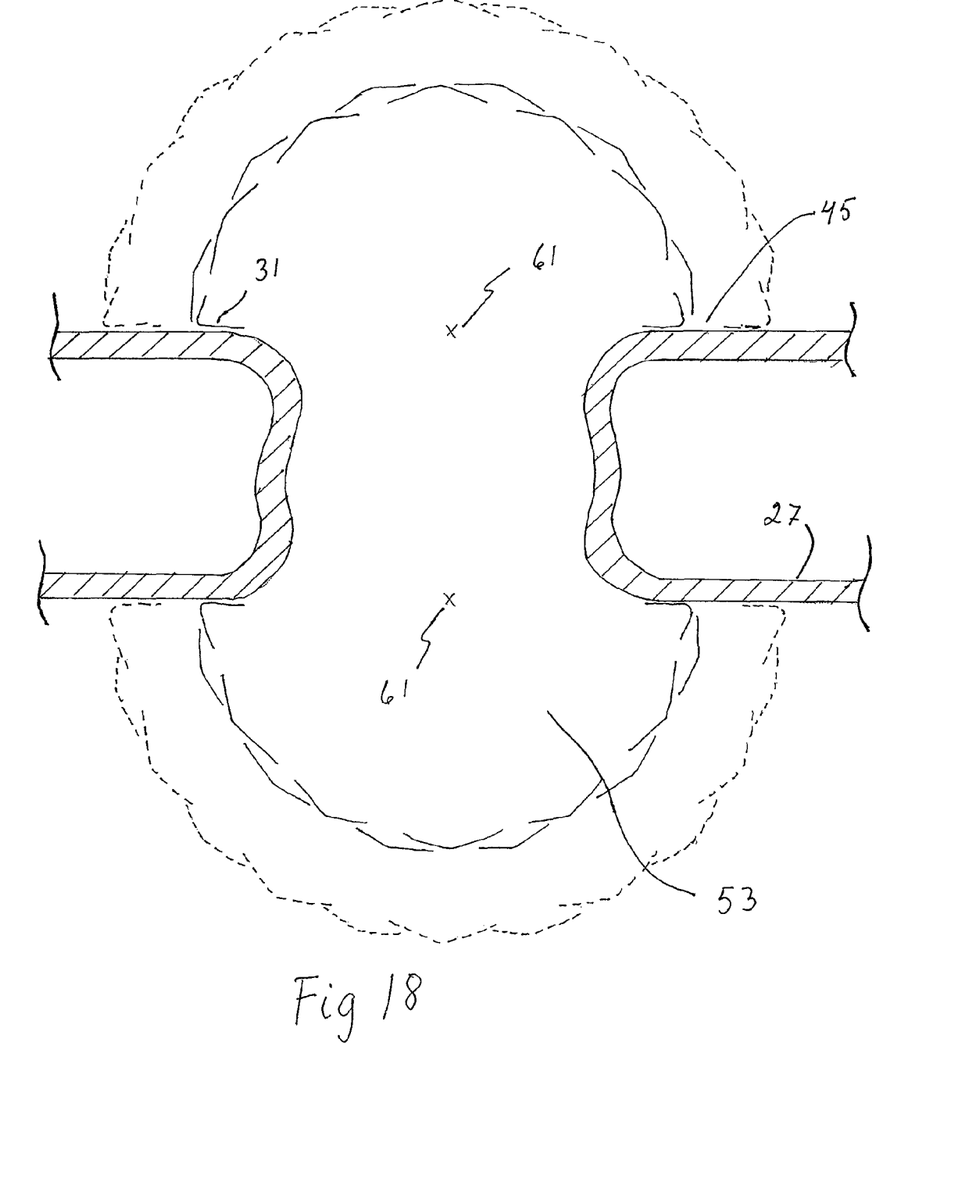
FIG. 18 is a schematic rear view of a jet motor outlet according to one embodiment of the invention.

FIG. 18 presents an additional form of the outlet that is covered by the invention. The circular segments 53 are in the form of two semicircles with separate circular midpoints 61 and located at a distance from each other. Even here the two stationary border elements 27 comprise flat connection parts 45 in the areas which come in contact with the movable coupling means 31 and these connection parts 45 are directed substantially radially in regard of their adjacent semicircles.

It should be obvious to the reader that the form of the outlet is not intended to be limited by the examples shown in the figures. Instead, the scope of the invention is limited by the technical features described in the claims.

Features of the above mentioned different embodiments may be combined with each others.

The invention claimed is:

1. A jet engine outlet (1) comprising:
    movable border segments (3) forming at least one substantially part-circular arc (29) and being movable radially for controlling the form and area of the outlet (1);
    at least one stationary border element (27) for defining the form and area of the outlet (1); and
    at least one movable coupling (31) for connecting the at least one substantially part-circular arc (29) to the at least one stationary border element (27),
    wherein:
        the at least one substantially part-circular arc is centered about at least one arc centerline that is proximate to an engine centerline;
        the at least one movable coupling (31) is movable along a connection part (45) of the at least one stationary border element (27); and
        the connection part (45) of the at least one stationary border element (27) is substantially flat and extending in a substantially radial direction of the at least one substantially part-circular arc (29); and
    the at least one stationary border element and the at least one substantially part-circular arc together form a non-circular outlet shape at a cross-section through an axial plane of the outlet.

2. A jet engine outlet according to claim 1, wherein:
    the movable border segments (3) and the at least one movable coupling (31) is hingedly connected to a fixed part (13) of the outlet (1);
    the movable border segments (3) are moved by means of a pressure inducing means (19) affecting the movable border segments (3); and
    the at least one movable coupling (31) is moved by means of a linkage system (23).

3. A jet engine outlet according to claim 1, wherein the at least one movable coupling (31) is formed as an oblong segment that is bent approximately 90° in a lengthwise direction to fit tightly to the connection part (45) of the at least one stationary border element (27) and to the adjacent movable border segments (3).

4. A jet engine outlet according to claim 1, wherein the at least one movable coupling (31) comprises:
    an upper part (31c) positioned on one side of the at least one stationary border element;
    a lower part (31d) positioned on the other side of the at least one stationary border element; and
    at least one connection element (41) for connecting the upper part (31c) with the lower part (31d),
    wherein the at least one movable coupling (31) is movable in a guide channel (43) in the at least one stationary border element (27).

5. A jet engine outlet according to claim 1, wherein the at least one stationary border element (27) is a part of the aircraft fuselage.

6. A jet engine outlet according to claim 1, wherein the at least one stationary border element (27) is protruding rear of the substantially part-circular arc (29).

7. A jet engine outlet according to claim 1, wherein stabilizers (37) are provided on both sides of the outlet (1).

8. A jet engine outlet according to claim 1, wherein the outlet is shielded by two structure elements (59) provided on each side of the outlet.

9. A jet engine outlet according to claim 1, wherein the movable border segments (3) form a semicircle.

10. A jet engine outlet according to claim 9, wherein the at least one stationary border element (27) is substantially flat.

11. A jet engine outlet according to claim 1, wherein the at least one substantially part-circular arc (29) comprises two substantially part-circular arcs (29), the two substantially part-circular arcs (29) being located symmetrically on a vertical axis one above the other and with the concave sides of the two substantially part-circular arcs (29) being directed towards each other.

* * * * *